(12) United States Patent
Shimizu

(10) Patent No.: US 8,141,464 B2
(45) Date of Patent: Mar. 27, 2012

(54) MILLING CUTTER OF CRANK SHAFT MILLER, AND CUTTER TIP AND CUTTER TIP SET FOR MILLING CUTTER OF CRANK SHAFT MILLER

(75) Inventor: Youichirou Shimizu, Komatsu (JP)

(73) Assignee: Komatsu NTC Ltd., Toyama (JP)

( * ) Notice: Subject to any disclaimer, the term of this patent is extended or adjusted under 35 U.S.C. 154(b) by 538 days.

(21) Appl. No.: 12/222,735

(22) Filed: Aug. 14, 2008

(65) Prior Publication Data

US 2009/0052997 A1 Feb. 26, 2009

(30) Foreign Application Priority Data

Aug. 23, 2007 (JP) ................. 2007-217035
Jul. 1, 2008 (JP) ................. 2008-172008

(51) Int. Cl.
*B23B 5/18* (2006.01)
*B23B 5/14* (2006.01)
(52) U.S. Cl. .......................... 82/106; 407/42
(58) Field of Classification Search .............. 82/106; 407/42, 58, 60, 62, 113
See application file for complete search history.

(56) References Cited

U.S. PATENT DOCUMENTS

| | | | | |
|---|---|---|---|---|
| 4,790,693 | A * | 12/1988 | Koblesky | 407/35 |
| 6,227,772 | B1 * | 5/2001 | Heinloth et al. | 407/113 |
| 7,097,393 | B2 * | 8/2006 | Satran et al. | 407/113 |
| 7,549,825 | B2 * | 6/2009 | Wermeister | 407/113 |
| 7,713,006 | B2 * | 5/2010 | MacLennan et al. | 407/113 |
| 2007/0104546 | A1 * | 5/2007 | Maeta et al. | 407/113 |
| 2009/0123242 | A1 | 5/2009 | Heinloth et al. | |
| 2009/0162155 | A1 * | 6/2009 | Wermeister | 407/114 |
| 2009/0232612 | A1 | 9/2009 | Heinloth et al. | |

FOREIGN PATENT DOCUMENTS

| | | |
|---|---|---|
| DE | 19704931 C1 | 3/1998 |
| DE | 102005037310 A1 | 12/2006 |
| DE | 102005038021 A1 | 1/2007 |
| JP | 62-039106 A | 2/1987 |
| JP | 2000-354905 A | 12/2000 |
| JP | 2001-334407 A | 12/2001 |
| JP | 2002-200517 A | 7/2002 |
| JP | 2009066748 A * | 4/2009 |

OTHER PUBLICATIONS

German Office Action mailed on Mar. 18, 2010 issued from the German Patent Office in the corresponding German patent application No. DE102008039135.2 (English translation only).
Korean Office Action mailed on Oct. 25, 2010 issued from the Korean Patent Office in the corresponding Korean patent application No. 2008-82277 (with partial English translation).

* cited by examiner

*Primary Examiner* — Will Fridie, Jr.
(74) *Attorney, Agent, or Firm* — Posz Law Group, PLC

(57) ABSTRACT

A vertical outer circumferential cutter tip, which has an approximate hourglass shape that is narrower at its middle than at its ends, and all of its eight corners are acute angles. Both sides of the vertical outer circumferential cutter tip are relieved at an angle α. When performing cutting processing upon the side surface of a counter weight with the vertical outer circumferential cutter tip, excessive friction is prevented. The shapes of the upper end portion and the lower end portion of the vertical outer circumferential cutter tip are formed so as to be very gently convexed, and with a relief of an angle β. Abrasion of the upper end portion and the lower end portion of the vertical outer circumferential cutter tip is prevented before the acute angled corner used for cutting is damaged.

5 Claims, 5 Drawing Sheets

MILLING CUTTER OF CRANK SHAFT MILLER, AND CUTTER TIP AND CUTTER TIP SET FOR MILLING CUTTER OF CRANK SHAFT MILLER

CROSS-REFERENCE TO RELATED APPLICATION

This application is based on Japanese Patent Application No. JP2007-217035 filed on Aug. 23, 2007, and Japanese Patent Application No. 2008-172008 filed on Jul. 1, 2008. The contents of both of the aforementioned applications are incorporated herein by reference.

TECHNICAL FIELD

The present invention relates to an improvement in a milling cutter of a crank shaft miller, and to improvements in a cutter tip and a cutter tip set which are used in a milling cutter of a crank shaft miller.

BACKGROUND ART

As for example shown in FIG. 1, a milling cutter of a crank shaft miller comprises a cutter body 1 which is formed in an approximate ring shape, and a plurality of cutter tips 2a, 2b, and 2c which are positioned at appropriate intervals along both side edges of the inner circumferential surface of the cutter body 1 and are fixedly attached thereto. The shapes of the above described cutter tips 2a, 2b, and 2c, as seen from their fronts and backs, are formed as approximate parallelograms, and cutting edges are formed along their ridge lines at a plurality of corners and in the neighborhood thereof. Per se known techniques related to the above described type of milling cutter are, for example, disclosed in Patent Document #1.

Patent Document #1: Japanese Laid-Open Patent Publication 2000-354905.

Now, with a milling cutter of the structure described above, since it is necessary to perform a large amount of cutting when performing machining processing (for so called rough machining) of a side surface of a counter weight and the contiguous outer circumferential surface of a pin journal, accordingly two cutter tips of the same shape (2a, 2b) are used by being fixedly attached to the cutter body 1 in attitudes so that one of the long sides of the cutter tip 2a faces the outer circumferential surface of the pin journal, while one of the long sides of the other cutter tip 2b faces the side of the counter weight, and moreover so that the track of the cutting by the other cutter tip 2b described above is superimposed upon the track of cutting by the one cutter tip 2a described above. In the following explanation, for the sake of convenience, that cutter tip 2a which is mounted in such an attitude that one of its long sides faces the outer circumferential surface of the pin journal is termed the "horizontal outer circumferential cutter tip", while that cutter tip 2b which is mounted in such an attitude that one of its long sides faces the side surface of the counter weight is termed the "vertical outer circumferential cutter tip". Moreover, when performing a small amount of further cutting upon the site described above (for so called finishing machining), a single cutter tip 2c which has the same shape as each of the two cutter tips 2a and 2b described above is used by being fixedly attached to the cutter body 1 in such an attitude that one of its long sides faces the side surface of the counter weight. In the following explanation, for the sake of convenience, this cutter tip 2c will be termed the "side cutter tip".

Thus, two each of the horizontal outer circumferential cutter tip 2a, the vertical outer circumferential cutter tip 2b, and the side cutter tip 2c (i.e. a total of six cutter tips) constitute one set of cutter tips; and a plurality of these cutter tip sets (2a, 2b, and 2c) are fixedly attached at appropriate intervals along both side edges of the inner circumferential surface of the cutter body 1, with the task of machining the crank shaft being performed principally by using the acute angled corners at four spots upon each of these cutter tips (2a, 2b, 2c) (the frequency of using the acute angled corners is approximately twice the frequency of using the obtuse angled corners). And, when one of these acute angled corners suffers damage due to the cutting task, the fixing direction of that one of these cutter tips (2a, 2b, 2c) to the cutter body 1 is changed over, in order to continue the cutting task using its other acute angled corners which are not damaged.

However since, no matter how many of the cutter tips (2a, 2b, 2c) may be reversed in fixing direction, the frequency of use of the acute angled corners is approximately twice the frequency of use of the obtuse angled corners, accordingly it unavoidably becomes necessary to change over some of the cutter tips (2a, 2b, 2c) for new ones even though their obtuse angled corners may not be completely worn out, and therefore it has not been possible to avoid the problem that the running cost becomes very substantial.

SUMMARY

Accordingly the object of the present invention is to provide a milling cutter of a crank shaft miller, and a cutter tip and a cutter tip set to be used in a milling cutter of a crank shaft miller, which make it possible, in the machining process for a crank shaft, to make full use of all of the plurality of cutting edges (corners) formed upon the cutter tips which are used, thus making it possible to reduce the frequency with which the cutter tips are changed over, so that a decrease in the running cost of this milling cutter of a crank shaft miller may be anticipated.

According to a first aspect of the present invention, there is provided a cutter tip (3) for use with a milling cutter of a crank shaft miller, with the cutter tip (3) being formed so that its shape as seen from its front and back defines an approximately hourglass shape which is narrower at its middle than at its ends, and so that all of the corners of the cutter tip (3) are set to acute angles as seen from the front and back.

According to a second aspect of the present invention, a milling cutter of a crank shaft miller for performing machining processing upon the side surface of a counter weight (37) and upon the outer circumferential surface of a pin journal (39) comprises: a cutter body (1); and a first cutter tip (3) which is detachably attached to the cutter body (1), and which is formed so that its shape as seen from its front and back defines an approximately hourglass shape which is narrower at its middle than at its ends, and moreover all of whose corners are set to acute angles as seen from its front and back.

In a preferred embodiment of this second aspect of the present invention, further comprises a plurality of second cutter tips (4a, 4b) which are detachably attached to the cutter body (1), and which are formed so that their shapes as seen from their fronts and backs define approximate parallelograms. The second cutter tips (4a, 4b) are used as a side cutter tip which performs cutting of the side surface of the counter weight (37), and as a horizontal outer circumferential cutter tip which performs cutting of the side surface of the counter weight (37) and the outer circumferential surface of the pin journal (39).

In the above-mentioned embodiment, the first cutter tip (3) is used as a vertical outer circumferential cutter tip which performs cutting of the side surface of the counter weight (37) and the outer circumferential surface of the pin journal (39).

Furthermore, in the above-mentioned embodiment, the first cutter tip (3) is disposed at a predetermined position upon a milling cutter body, in an attitude in which one of its sides faces the side surface of the counter weight (37), and moreover so that the track of cutting by the above described first cutter tip (3) is superimposed upon the track of cutting by the above described second cutter tip (4a) which is used as a horizontal outer circumferential cutter tip.

Moreover, in the above-mentioned embodiment, the second cutter tip (4b) which is used as the side cutter tip is disposed at a predetermined position upon a milling cutter body in an attitude in which one of its sides faces the side surface of the counter weight (37), and the other second cutter tip (4a) which is used as the horizontal outer circumferential cutter tip is disposed at a predetermined position upon the milling cutter body in an attitude in which one of its sides faces the outer circumferential surface of the pin journal (39).

Even further, in the above-mentioned embodiment, the first cutter tip (3) may be formed so that the shapes of its upper end portion and its lower end portion, as seen from its front and back, are convexed.

And, in the above-mentioned embodiment, the first and second cutter tips (3, 4a, 4b) may be fixedly attached to a cutter body (1) at predetermined spots, in states in which they are relieved at predetermined angles with respect to the side surface of the counter weight (37).

And, according to a third aspect of the present invention, a cutter tip set for use with a milling cutter of a crank shaft miller comprises: a first cutter tip (3) which is formed so that its shape as seen from its front and back defines an approximately hourglass shape which is narrower at its middle than its ends, and so that all of its corners are set to acute angles as seen from the front and back; and second cutter tips (4a, 4b) which are formed so that their shapes as seen from their fronts and backs define approximate parallelograms.

According to the present invention, during the process of machining a crank shaft, it is possible to make full use of all of the plurality of cutting edges (corners) formed upon the cutter tips which are used, so that it becomes possible to reduce the frequency with which the cutter tips are changed over, whereby it is possible to anticipate a decrease in the running cost of this milling cutter of a crank shaft miller.

PREFERRED EMBODIMENTS FOR IMPLEMENTATION OF THE INVENTION

In the following, embodiments of the present invention will be described in detail with reference to the drawings.

Figure 1:
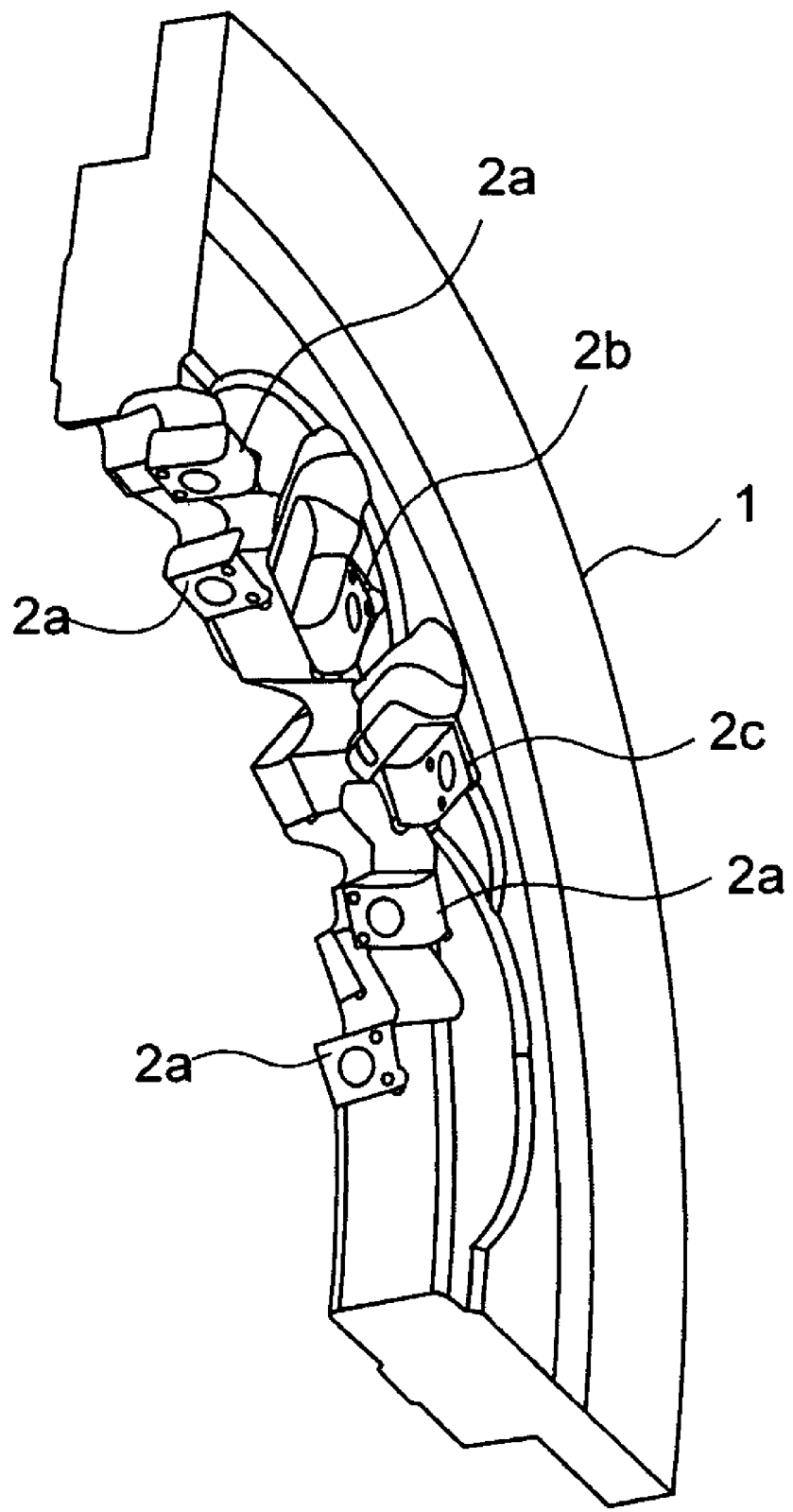
FIG. 1 is a partial perspective view showing an example of the structure of a milling cutter of a crank shaft miller (this figure shows the general structure which can be employed in both of a conventional milling cutter and also of the milling cutter according to one embodiment of the present invention)

A milling cutter for a crank shaft miller according to one embodiment of the present invention is of the inner cutter tip type (of milling cutter), like the milling cutter of the prior art type crank shaft miller shown in FIG. 1. On each of the one side edge and the other side edge of the internal circumferential side of the cutter body of this milling cutter, there are fixedly attached 24 cutter tips, for a total of 48 in all. (In FIG. 1, for the convenience of explanation, only six cutter tips are shown.) However, in the embodiments of the present invention explained below, as the above described cutter tips, two types of cutter tip are employed which have mutually different shapes as seen from their fronts and backs, with these cutter tips being fixedly attached to a cutter body which has a roughly similar structure to that of the cutter body 1 shown in FIG. 1

Thus, in FIG. 2 and subsequent figures which show the principal portions of a ring cutter of a crank shaft miller according to an embodiment of the present invention, these two types of cutter tips are shown as the first cutter tips 3 and the second cutter tips 4a and 4b. It should be understood that the detailed structure of the first cutter tips 3 and the second cutter tips 4a and 4b will be described hereinafter.

On one of the side edges of the inner circumferential side of the cutter body described above (in other words of the cutter body which has a roughly similar structure to that of the cutter body 1 shown in FIG. 1; and the same hereinafter), there are arranged 24 cutter tips in the following sequence, along the direction of rotation of the cutter body from the upstream side towards the downstream side (which corresponds to the clockwise direction in FIG. 1; and the same hereinafter): a cutter tip which is used as a side cutter tip; a cutter tip which is used as a vertical outer circumferential cutter tip; a cutter tip which is used as a horizontal outer circumferential cutter tip; and so on. In a similar manner, on the other side edge of the inner circumferential side of the cutter body as well, there are arranged 24 cutter tips in the following sequence, along the direction of rotation of the cutter body from the upstream side towards the downstream side: a cutter tip which is used as a side cutter tip; a cutter tip which is used as a vertical outer circumferential cutter tip; a cutter tip which is used as a horizontal outer circumferential cutter tip; and so on. In this embodiment, first cutter tips 3 are used for the vertical outer circumferential cutter tips, and second cutter tips 4a and 4b are respectively used for the horizontal outer circumferential cutter tips and the side cutter tips. Accordingly, in the following explanation, the reference symbol 3 will be used for the vertical outer circumferential cutter tips, the reference symbol 4a will be used for the horizontal outer circumferential cutter tips, and the reference symbol 4b will be used for the side cutter tips.

The above described first and second cutter tips (3, 4a, and 4b) are made as groups: one group consists of three of the cutter tips which are used as the vertical outer circumferential cutter tip, the horizontal outer circumferential cutter tip, and the side cutter tip which are fixedly attached to one side edge of the inner circumferential side of the above described cutter body, while another group consists of other three of the cutter tips which are used for the vertical outer circumferential cutter tip, the horizontal outer circumferential cutter tip, and the side cutter tip which are fixedly attached to the other side edge of the inner circumferential side of the above described cutter body. To put this in another manner, the three of the first and second cutter tips (3, 4a, and 4b) which are respectively used for the vertical outer circumferential cutter tip, the horizontal outer circumferential cutter tip, and the side cutter tip which are fixedly attached to the above described one side edge, and the other three of the first and second cutter tips (3, 4a, and 4b) which are respectively used for the vertical outer circumferential cutter tip, the horizontal outer circumferential cutter tip, and the side cutter tip which are fixedly attached to the above described other side edge, together constitute a single set of a total of six cutter tips. Accordingly, a total of eight sets of cutter tips (each consisting of two of the first cutter tip 3 and two each of the second cutter tips 4a and 4b) are fixedly attached to the above described cutter body.

FIG. 2 is an explanatory figure showing the positional relationship between one set of cutter tips (six cutter tips in all) which are fixedly attached to the main body of a milling cutter of a crank shaft miller according to an embodiment of the present invention, and a crank shaft upon which machining processing is being performed.

Figure 2A:
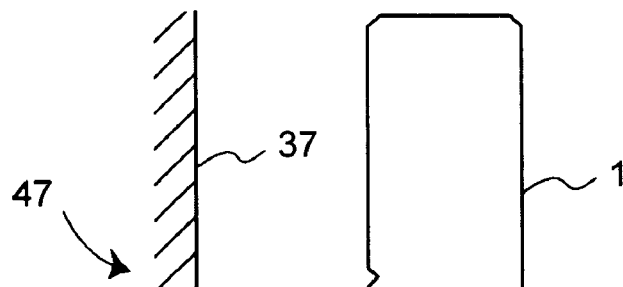
FIG. 2(A) is an explanatory figure showing the positional relationship between one set of cutter tips (six cutter tips in all) which are fixed to the main body of a milling cutter of a crank shaft miller according to an embodiment of the present invention, and a crank shaft upon which machining processing is being performed, while FIGS. 2(B), 2(C), and 2(D) respectively show perspective views of three different types of these cutter tips (with cutting edge portions thereof being marked by hatching)

In FIG. 2, the cutter body to which the side cutter tips 4b and the vertical outer circumferential cutter tips 3 and the horizontal outer circumferential cutter tips 4a (which are the two types of cutter tip previously explained) are fixedly attached (i.e. the cutter body which has a roughly similar structure to the prior art cutter body shown in FIG. 1) performs machining processing upon the side surface of a counter weight 37 and upon the outer circumferential surface of a pin journal 39 by shifting in the upwards and downwards direction in FIG. 2(A). The vertical outer circumferential cutter tip 3 and the horizontal outer circumferential cutter tip 4a are fixedly attached to the above described cutter body 1 in attitudes such that one of the long sides of the vertical outer circumferential cutter tip 3 faces the side surface of the counter weight 37 and one of the long sides of the horizontal outer circumferential cutter tip 4a faces the outer circumferential surface of the pin journal 39, and moreover such that the track of cutting by the vertical outer circumferential cutter tip 3 is superimposed upon the track of cutting by the horizontal outer circumferential cutter tip 4a. The vertical outer circumferential cutter tip 3 and the horizontal outer circumferential cutter tip 4a cooperate together and perform machining processing at locations from the side surface of the counter weight 37 to the outer circumferential surface of the pin journal 39. Since, as already described, these locations from the side surface of the counter weight 37 to the outer circumferential surface of the pin journal 39 are locations upon which a comparatively large amount of machining processing is to be performed, accordingly the machining processing upon the above described sites is performed so that the track of cutting by the horizontal outer circumferential cutter tip 4a and the track of cutting by the vertical outer circumferential cutter tip 3 are mutually superimposed. The joint corner between the counter weight 37 and the pin journal 39 is machined so as to be rounded.

Figure 2B:
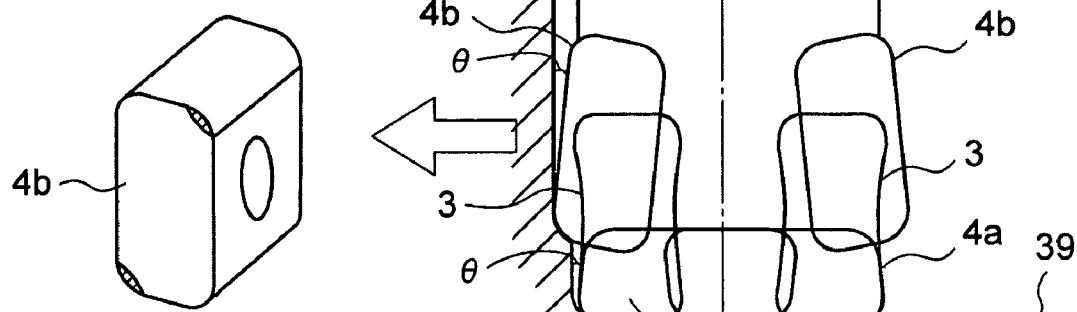
Figure 2C:
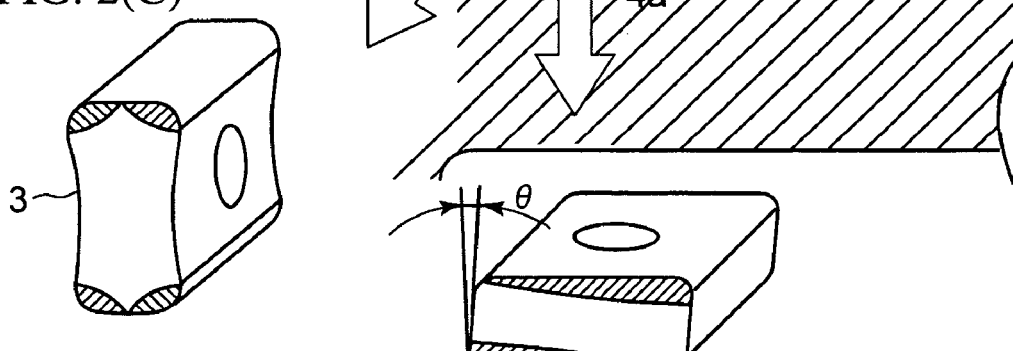
Figure 2D:
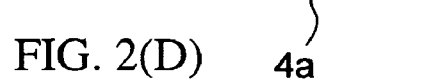

The side cutter tips 4b are made in a shape shown in FIG. 2(B), and they are fixedly attached to the above described cutter body 1 in such an attitude that their long sides face the side surfaces of the counter weight 37. This side cutter tip 4b performs machining processing by a comparatively small cutting amount upon the side surface of the counter weight 37, after it has already been machined by a comparatively large cutting amount by the horizontal outer circumferential cutter tip 4a and the vertical outer circumferential cutter tip 3. The side cutter tip 4b, the vertical outer circumferential cutter tip 3, and the horizontal outer circumferential cutter tip 4a are disposed in predetermined positions upon the inner circumferential side of the cutter body 1 described above, in a state in which each of them subtends an angle of E with respect to the side surface of the counter weight 37. In order to allow for this relief, for both of the side cutter tip 4b and the horizontal outer circumferential cutter tip 4a, ones are employed which are formed in approximate parallelograms as seen from their fronts and backs (refer to FIG. 2(D), and to FIG. 2(B) described above which shows the shape of the horizontal outer circumferential cutter tip 4a). With regard to the vertical outer circumferential cutter tip 3 as well, this is disposed in a predetermined position upon the inner circumferential side of the cutter body 1 described above, in the same state with a certain relief being allowed, as in the case of the side cutter tip 4b and the horizontal outer circumferential cutter tip 4a. This vertical outer circumferential cutter tip 3 has the overall shape shown in FIG. 2(C), but the shape of this vertical outer circumferential cutter tip 3 as seen from its front and its back will be described in detail hereinafter.

In this embodiment, cutting processing is performed by the side cutter tip 4b upon the side surface of the counter weight 37 using its obtuse angled corner, while cutting processing is performed by both the vertical outer circumferential cutter tip 3 and the horizontal outer circumferential cutter tip 4a upon the sites from the side surface of the counter weight 37 to the outer circumferential surface of the pin journal 39 using their acute angled corners. The reason that the obtuse angled corner of the side cutter tip 4b is used is that the site upon which the cutting processing is performed by the side cutter tip 4b, in other words the side surface of the counter weight 37, is a site upon which cutting processing has mostly already been performed by the vertical outer circumferential cutter tips 3 and the horizontal outer circumferential cutter tips 4a, so that the side cutter tip 4b may be the to be performing finishing processing in its cutting processing, with its cutting amount being small. In addition to the above, this is also done in order to prevent only the acute angled corners (of the cutter tips 3, 4a, and 4b described above) being damaged at an early stage, if only the acute angled corners are used.

The above described side cutter tip 4b, vertical outer circumferential cutter tip 3, and horizontal outer circumferential cutter tip 4a constitute one single set of cutter tips (3, 4a, and 4b); the cutter tip 4b, the vertical outer circumferential cutter tip 3, and the horizontal outer circumferential cutter tip 4a which are fixedly attached to the other side edge of the inner circumferential side of the above described cutter body 1 are structured and affixed in the same manner.

Figure 3:
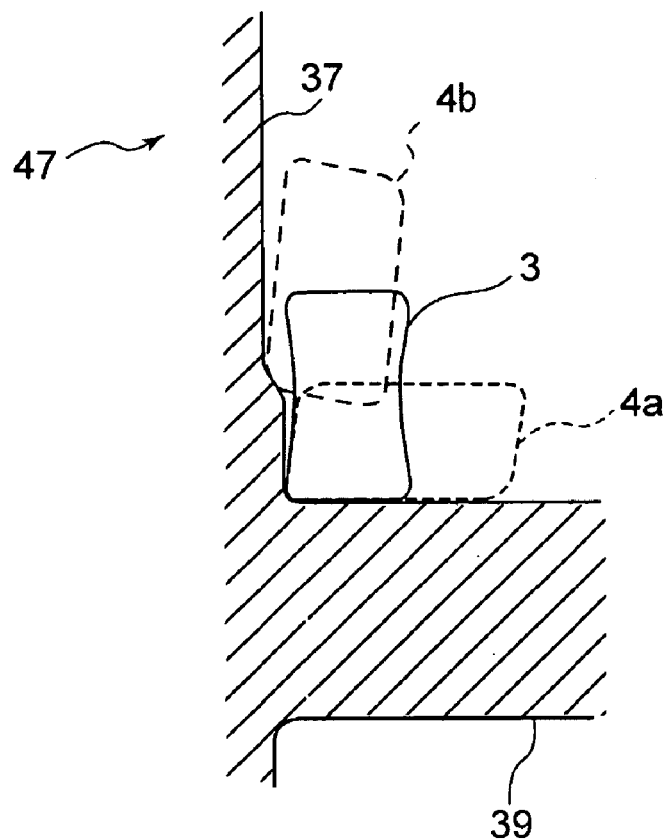
FIG. 3 is an explanatory figure showing the positional relationship between three of the six cutter tips shown in FIG. 2, and the crank shaft which is being machined.

FIG. 3 is an explanatory figure showing the positional relationship between three (3, 4a, and 4b) of the six cutter tips shown in FIG. 2, and the crank shaft 47 which is being machined.

As shown in FIG. 3, the vertical outer circumferential cutter tip 3 is disposed on the cutter body (not shown in FIG. 3) in an attitude in which its elongated direction is substantially parallel to the side surface of the counter weight 37. Cutting processing is performed upon the side surface of the counter weight 37 up to the outer circumferential surface of the pin journal 39, which is the location where cutting processing by a large cutting amount is necessary, by ensuring that the track of cutting by the horizontal outer circumferential cutter tip 4a and the track of cutting by the vertical outer circumferential cutter tip 3 are mutually superimposed, and by using the acute angled corners of these cutter tips 3 and 4a. Thereafter, cutting processing by a small cutting amount is performed upon the above described side surface of the counter weight 37 using the obtuse angled corner of the side cutter tip 4b.

As already described, in the cutting processing for a crank shaft or the like, in order to be able to anticipate decrease in the running cost of a milling cutter, it is necessary to reduce as much as possible the frequency of changing of the cutter tips (3, 4a, and 4b) for new ones, so as to be able to make full use of all of the plurality of cutting edges which are formed upon the cutter tips (3, 4a, and 4b) which are used (locations which include their corners). Thus, since both the acute angled corners, which are not used in the cutting processing by the side cutter tip 4b, and also the obtuse angled corners, which are not used in the cutting processing by the horizontal outer circumferential cutter tip 4a, are used effectively, accordingly a technique has been conceived and elaborated for, at appropriate timings, using the side cutter tip 4b as the horizontal outer circumferential cutter tip 4a, and using the horizontal outer circumferential cutter tip 4a as the side cutter tip 4b. If this technique is employed, it is possible to make effective use both of the acute angled corners on the side cutter tip 4b which are not used, and also of the obtuse angled corners upon the horizontal outer circumferential cutter tip 4a which are not used, so that, at least between the side cutter tips 4b and the horizontal outer circumferential cutter tips 4a, it is possible to reduce the frequency of changing over the cutter tips (the cutter tips 4a and 4b) for new ones.

In other hand, the vertical outer circumferential cutter tip 3 has a shape in which all of the eight corners are acute angled corners and can be used for cutting processing. In detail, according to this embodiment of the present invention, the shape of this cutter tip 3, as seen from its front and back, may be described as an approximately hourglass shape (or a wasp-waisted shape) which is narrower at its middle than at its ends.

Figure 4:
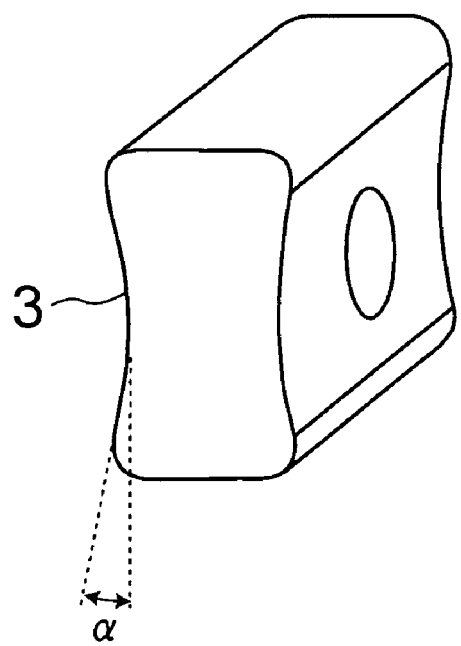
FIG. 4 is a perspective view showing the shape of a vertical outer circumferential cutter tip according to an embodiment of the present invention, as seen from its front and back.

To explain the shape of the above described vertical outer circumferential cutter tip 3 as seen from its front and back in more detail, as shown in FIG. 4, the overall shape of the above described vertical outer circumferential cutter tip 3 as seen from its front and back defines an approximately hourglass shape, and moreover the above described vertical outer circumferential cutter tip 3 is formed so as to be symmetric about its central plane (not shown in the figure) in the horizontal direction in FIG. 4. In other words, the above described vertical outer circumferential cutter tip 3 is formed so that, if its upper portion and its lower portion were to be cut apart along the central plane (not shown in the figure) in the above described horizontal direction, the shapes of both of these portions, as seen from its front and back, would have approximately the same symmetrical trapezoidal shape, and moreover so that all of the eight corners which the above described vertical outer circumferential cutter tip 3 possesses are, as seen from its front and back, acute angled corners.

As shown in FIG. 4, the shape of the above described vertical outer circumferential cutter tip 3 in the vertical direction is concaved very gently, from its upper end portion and from its lower end portion, towards the central portion of the above described vertical outer circumferential cutter tip 3, so that, due to this, it is relieved at an angle of $\alpha$. By this relief being provided, it is possible to prevent the occurrence of excessive friction when cutting processing is being performed upon the side surface of the counter weight 37, in the state in which the track of cutting by the above described vertical outer circumferential cutter tip 3 is superimposed upon the track of cutting by the horizontal outer circumferential cutter tip 4a, by both of them cooperating together. The shapes of the upper end portion and the lower end portion of the vertical outer circumferential cutter tip 3 are flat or planar.

By employing vertical outer circumferential cutter tips 3 having the structure described above in each of the sets of cutter tips which consists of a total of six cutter tips, i.e. of two of the side cutter tip 4a already described, two of this vertical outer circumferential cutter tip 3, and two horizontal outer circumferential cutter tips 4b, it is possible to use in an effective manner the acute angled corners and the obtuse angled corners which have not been used of both the side cutter tip 4b and the horizontal outer circumferential cutter tip 4a, by mutually interchanging them. Not only that, but since, in the case of the vertical outer circumferential cutter tip 3 for which no other cutter tip exists with which it can be mutually interchanged in the same set of the six cutter tips, all of its eight corners are acute angled corners, because it is interchanged with a new vertical outer circumferential cutter tip 3 only after all of its acute angled corners have been made full use of for cutting work, accordingly it is possible to reduce the frequency of changing of the cutter tips (3, 4a, and 4b), and thereby it becomes possible to anticipate a decrease in the running cost of this milling cutter.

Figure 5:
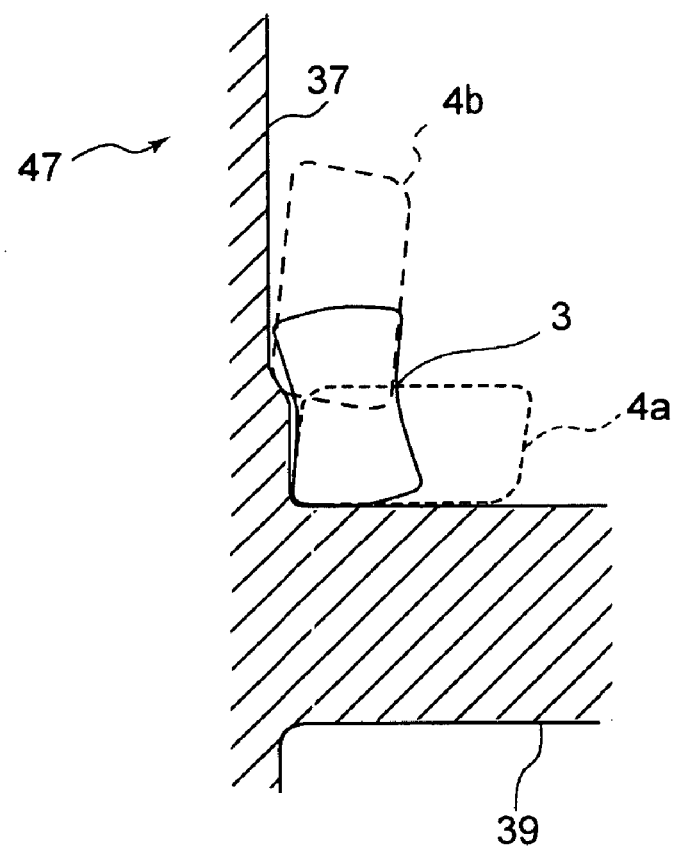
FIG. 5 is an explanatory figure showing the positional relationship between three of six cutter tips according to the second embodiment of the present invention, and a crank shaft which is being machined.

FIG. 5 is an explanatory figure showing the positional relationship between three of six cutter tips according to another embodiment of the present invention, and a crank shaft 47 which is being subjected to machining processing. It should be understood that, in FIG. 5, to elements which have the same or similar functions as elements in FIG. 3, the same reference symbols are appended, and detailed description thereof is curtailed.

In the second embodiment shown in FIG. 5, the shape and the orientation of the vertical outer circumferential cutter tip 3 is different from those in the first embodiment shown in FIGS. 2-4. As shown in FIG. 5, the shape of the vertical outer circumferential cutter tip 3, as seen from its front and back, may be described as an approximately hourglass shape which is narrower at its middle than at its ends. In detail, the vertical outer circumferential cutter tip 3 is formed so that, if its upper portion and its lower portion were to be cut apart along the central plane (not shown in the figure) in the above described horizontal direction, the shapes of both of these portions, as seen from its front and back, would have approximately the same pentagonal shape, and moreover so that all of the eight corners which the above described vertical outer circumferential cutter tip 3 possesses are, as seen from its front and back, acute angled corners.

Figure 6:
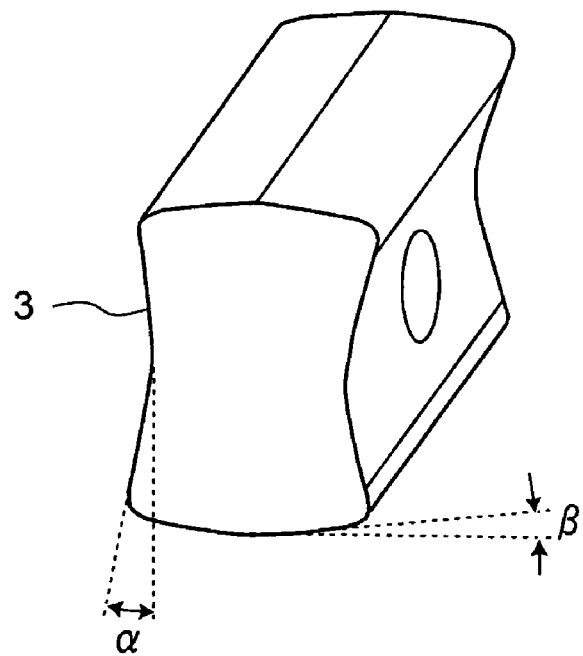
FIG. 6 is a figure showing the shape of a vertical outer circumferential cutter tip according to the second embodiment of the present invention, as seen from its front and back.

As shown in FIG. 6, the shape of the vertical outer circumferential cutter tip 3 in the vertical direction is concaved very gently, from its upper end portion and from its lower end portion, towards the central portion of the above described vertical outer circumferential cutter tip 3, so that, due to this, it is relieved at an angle of $\alpha$. By this relief being provided, it is possible to prevent the occurrence of excessive friction when cutting processing is being performed upon the side surface of the counter weight 37, in the state in which the track of cutting by the above described vertical outer circumferential cutter tip 3 is superimposed upon the track of cutting by the horizontal outer circumferential cutter tip 4a, by both of them cooperating together. In addition to the above, the shape of the upper end portion and the lower end portion of the vertical outer circumferential cutter tip 3 are formed so as to be convexed very gently, so that a tilt of an angle β is provided from the central portions of these upper and lower end portions facing their edge portions. In other words, at the upper end portion and its lower end portion of the above described vertical outer circumferential cutter tip 3, a relief of just the angle β is provided as well. And, as shown in FIG. 5, the vertical outer circumferential cutter tip 3 is attached on the cutter body (not shown in FIG. 5) in an attitude in which its elongated direction declines at the relief angle β to the side surface of the counter weight 37. Due to the relief of the angle β, the upper end portion or the lower end portion of the vertical outer circumferential cutter tip 3 is prevented from being abraded before the acute angled corner which is being used for the present cutting task is damaged.

Figure 7:
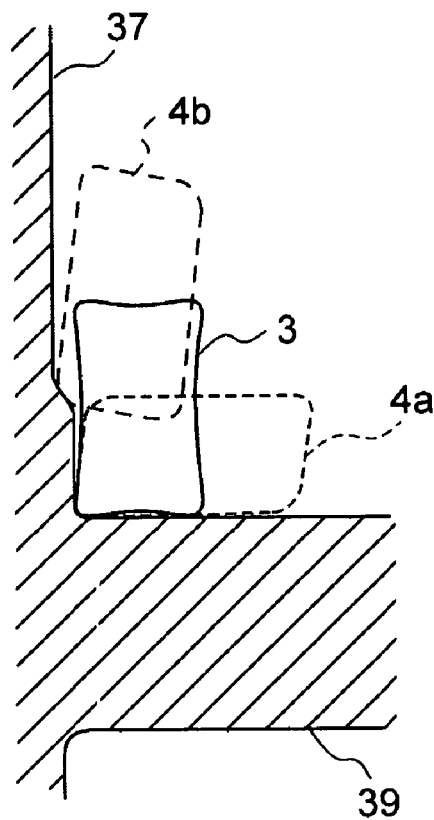
FIG. 7 is an explanatory figure showing the positional relationship between three of six cutter tips according to the third embodiment of the present invention, and a crank shaft which is being machined.

FIG. 7 is an explanatory figure showing the positional relationship between three of six cutter tips according to the third embodiment of the present invention, and a crank shaft 47 which is being subjected to machining processing. It should be understood that, in FIG. 7, to elements which have the same or similar functions as elements in FIG. 3, the same reference symbols are appended, and detailed description thereof is curtailed.

In the third embodiment shown in FIG. 7, the shape of the vertical outer circumferential cutter tip 3 is different from that in the first and second embodiments shown in FIGS. 2-6. As shown in FIG. 7, the shape of the vertical outer circumferential cutter tip 3, as seen from its front and back, may be described as an approximately hourglass shape which is narrower at its middle than at its ends, so that all of their corners which can be utilized in the cutting processing are, as seen from its front and back, acute angled corners. The vertical outer circumferential cutter tip 3 is disposed on the cutter body (not shown in FIG. 7) in an orientation in which its longitudinal direction is substantially parallel to the side surface of the counter weight 37.

Figure 8:
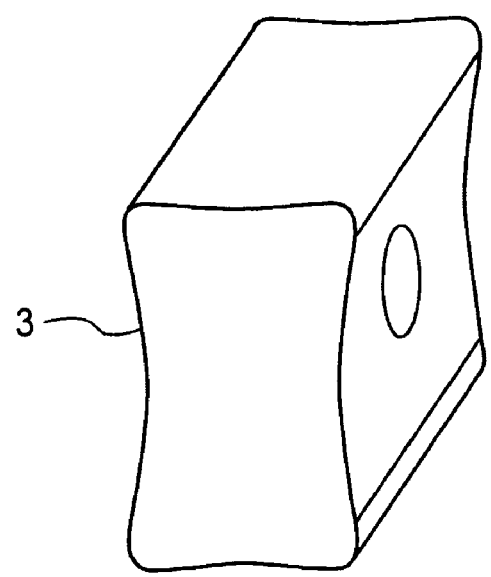
FIG. 8 is a figure showing the shape of a vertical outer circumferential cutter tip according to the third embodiment of the present invention, as seen from its front and back.

As shown in FIG. 8, the locations at the middle areas of the upper end portion and the lower end portion of the vertical outer circumferential cutter tip 3 are very gently concaved inwards. The other features of the structure of this vertical outer circumferential cutter tip 3 according to this other embodiment are the same as those of the vertical outer circumferential cutter tip 3 of the first embodiment shown in FIG. 4.

With this embodiment as well, similar advantageous operational effects can be obtained to those reaped in the case of the embodiment of the present invention described above.

Although preferred embodiments of the present invention have been explained in the above, these are only examples for explanation of the present invention, and the scope of the present invention is not to be considered as being limited only to these embodiments. It is possible to implement various changes and alterations to the present invention.

The invention claimed is:

1. A milling cutter of a crank shaft miller which performs machining processing upon a side surface of a counter weight and upon an outer circumferential surface of a pin journal, comprising:
   a cutter body; and
   a first cutter tip which is detachably attached to said cutter body, wherein the first cutter tip has front and back surfaces, which are opposite to each other, and said cutter tip has an approximate shape of an hourglass and is narrower at its middle than at its ends as seen when facing said front surface and said back surface, and all corners of said first cutter tip located on said front surface and said back surface are set to acute angles as seen when facing said front surface and said back surface, and said front and back surfaces are perpendicular to a rotating direction of said milling cutter, and
   a plurality of second cutter tips, which are detachably attached to said cutter body, wherein each second cutter tip has front and back surfaces, which are opposite to each other, and said each of the second cutter tips has an approximate shape of a parallelogram as seen when facing said front surface and said back surface of said second cutter tips,
   wherein said second cutter tips include a side cutter tip, which performs cutting of the side surface of said counter weight, and horizontal outer circumferential cutter tip, which performs cutting of the side surface of said counter weight and the outer circumferential surface of said pin journal.

2. The milling cutter of a crank shaft miller according to claim 1, wherein said first cutter tip is used as a vertical outer circumferential cutter tip, which performs cutting of the side surface of said counter weight and the outer circumferential surface of said pin journal.

3. The milling cutter of a crank shaft miller according to claim 2, wherein said first cutter tip is disposed at a predetermined position upon said cutter body, in an attitude in which one of its sides faces the side surface of said counter weight, and moreover so that a track of cutting by said first cutter tip is superimposed upon a track of cutting by said second cutter tip which is used as a horizontal outer circumferential cutter tip.

4. The milling cutter of a crank shaft miller according to claim 2, wherein:
   said side cutter tip is disposed at a predetermined position upon said cutter body in an attitude in which one of its sides faces the side surface of said counter weight; and
   said horizontal outer circumferential cutter tip is disposed at a predetermined position upon said cutter body in an attitude in which one of its sides faces the outer circumferential surface of said pin journal.

5. The milling cutter of a crank shaft miller according to claim 1, wherein said first and second cutter tips are fixedly attached to said cutter body at predetermined spots, in states in which they are relieved at predetermined angles with respect to the side surface of said counter weight.

* * * * *